United States Patent
Prats et al.

(10) Patent No.: US 8,049,657 B2
(45) Date of Patent: Nov. 1, 2011

(54) METHOD FOR PROCESSING TOPS (TERRAIN OBSERVATION BY PROGRESSIVE SCAN)-SAR (SYNTHETIC APERTURE RADAR)-RAW DATA

(75) Inventors: Pau Prats, Gilching (DE); Josef Mittermayer, Munich (DE); Rolf Scheiber, Puchheim (DE); Alberto Moreira, Olching (DE)

(73) Assignee: Deutsches Zentrum Fuer Luft - und Raumfahrt E.V., Cologne (DE)

( * ) Notice: Subject to any disclaimer, the term of this patent is extended or adjusted under 35 U.S.C. 154(b) by 80 days.

(21) Appl. No.: 12/667,238

(22) PCT Filed: Jun. 26, 2008

(86) PCT No.: PCT/EP2008/005180
§ 371 (c)(1),
(2), (4) Date: Jan. 8, 2010

(87) PCT Pub. No.: WO2009/003628
PCT Pub. Date: Jan. 8, 2009

(65) Prior Publication Data
US 2010/0207808 A1   Aug. 19, 2010

(30) Foreign Application Priority Data
Jul. 4, 2007   (DE) .......................... 10 2007 031 020

(51) Int. Cl.
*G01S 13/00* (2006.01)
(52) U.S. Cl. ................... 342/25 F; 342/25 R; 342/25 A; 342/25 B; 342/25 C; 342/25 D; 342/25 E
(58) Field of Classification Search ............... 342/25 R, 342/25 A, 25 B, 25 C, 25 D, 25 E, 25 F
See application file for complete search history.

(56) References Cited

U.S. PATENT DOCUMENTS
4,292,634 A * 9/1981 Frosch et al. ............... 342/25 A
(Continued)

FOREIGN PATENT DOCUMENTS
DE   4427657 A1   2/1996
(Continued)

OTHER PUBLICATIONS

Moreira, A. et al. :"Azimuth and Range Scaling for SAR and Scan SAR Processing", IGARSS '96. 1996 International GeoScience and Remote Sensing Symposioum 19960527, vol. 2, May 27, 1996, 1214-1216 XP009105500.
(Continued)

*Primary Examiner* — Thomas Tarcza
*Assistant Examiner* — Peter Bythrow
(74) *Attorney, Agent, or Firm* — Clements Bernard PLLC; Gregory N. Clements (57) ABSTRACT

Sub-aperture processing is carried out. Within each sub-aperture, range compression and a correction for the target range variation are carried out. Baseband azimuth scaling is used for processing the azimuth signal, wherein a long azimuth reference function and thus a wide azimuth dimension are prevented. The scaling range is not constant and depends on the range, which is not equal to the original range vector. It is calculated such that, in combination with a subsequent derotation step, constant azimuth scanning is achieved for all ranges. The selected derotation function, which is applied in the azimuth time domain, makes it possible for all the targets to be in base band, in this way varying the effective chirp rate. Since the phase is purely quadratic because of the azimuth scaling step, it is thus possible to use an optimal filter which takes account of the effective chirp rate. IFFT results in a focused image, and a final phase function in the time domain allows phase maintenance. Application for SAR, SONAR and seismic raw data processing in the TOPS mode, as well as other modes which make use of the antenna polar diagram being scanned in the azimuth and/or elevation direction.

2 Claims, 5 Drawing Sheets

U.S. PATENT DOCUMENTS

| | | | |
|---|---|---|---|
| 5,343,204 A * | 8/1994 | Farmer et al. | 342/25 F |
| 5,394,151 A * | 2/1995 | Knaell et al. | 342/25 F |
| 5,627,543 A * | 5/1997 | Moreira | 342/25 A |
| 5,812,082 A * | 9/1998 | Moreira et al. | 342/25 A |
| 6,222,933 B1 * | 4/2001 | Mittermayer et al. | 382/109 |
| 6,492,932 B1 * | 12/2002 | Jin et al. | 342/25 R |
| 6,873,285 B2 * | 3/2005 | Carrara et al. | 342/25 R |

FOREIGN PATENT DOCUMENTS

| | | |
|---|---|---|
| EP | 0795762 A2 | 9/1997 |
| EP | 0924534 A2 | 6/1999 |

OTHER PUBLICATIONS

Alberto Moreira et al, :"Extended Chirp Scaling Algorithm for Air- and Spaceborne SAR Data Processing in Stripmap and ScanSAR Imaging Modes", IEEE Transactions on Geoscience and Remote Sensing, IEEE Service Center, Piscataway, New Jersey, US, vol. 34, No. 5, (Sep. 1, 1996) XP011020772 ISSN: 0196-2892.

Mittermayer, J. et al. :"Sliding Spotlight Sar Processing for TerraSAR-X using a New Formulation on the Extended Chirp Scaling Algorithm", IGARSS 2003. IEEE 2003 International Geoscience and Remote Sensing Symposium Proceedings, Toulouse, France, Jul. 21-25, 2003; [IEEE International Geoscience and Remote Sensing Symposium], New York, NY : IEEE, US, vol. 3, 21. (Jul. 21, 2003) 1462-1464, XP010703419 ISBN: 978-0-7803-7929-9.

Andrea Monti Guarnieri et al.: "ScanSAR Focusing and Interferometry", IEEE Transactions on Geoscience and Remote Sensing, IEEE Service Center, Piscataway, New Jersey, US, vol. 34, No. 4, (Jul. 1, 1996), XP011010749, ISSN: 0196-2892.

Pratl, C. et al. : "Spot Mode SAR Focusing with the W—K Technique", Geoscience and Remote Sensing SYmposium, 1991. IGARSS '91. Remote Sensing: Global Monitoring for Earth Management., International Jun. 3-6, 1991, New York, NY, US IEEE, US., vol. 2, 3 (Jun. 3, 1991), 631-634, XP010041150, ISBN: 978-0-87942-675-0.

De Zan F., et al. : "TOPSAR: Terrain Observation by Progressive Scan", IEEE Transactions on Geoscience and Remote Sensing, IEEE Service Center, Piscataway, New Jersey, US, vol. 44, No. 9, (Sep. 1, 2006), 2352-2360, XP009105499, ISSN: 0196-2892.

* cited by examiner

METHOD FOR PROCESSING TOPS (TERRAIN OBSERVATION BY PROGRESSIVE SCAN)-SAR (SYNTHETIC APERTURE RADAR)-RAW DATA

TECHNICAL FIELD

The invention relates to a method for processing TOPS (Terrain Observation by Progressive Scan)-SAR(Synthetic Aperture Radar)-Raw Data into highly accurate image data.

First, a brief introduction into SAR and TOPS-SAR will be rendered hereunder. A radar with synthetic aperture, abbreviated SAR (Synthetic Aperture Radar), is an instrument for remote sensing which is increasingly finding application in imaging, surveyance and examination of the surface of the earth. Such a system consists of a carrier platform moving over the surface of the earth at a constant speed, an antenna facing into a direction orthogonal to the moving direction, and a coherent radar system for periodic emission of pulses of high-frequency electromagnetic waves at a pulse repetition frequency PRF.

The direction of the movement of the carrier platform is called the azimuth direction, and the orthogonal direction, oriented diagonally downward, is called the distance direction or also the range direction. In the normal SAR operating mode, called the strip mapping mode or also the stripmap mode, there is imaged, during the flight over a region to be surveyed, a strip of the length of the distance covered by the flight. The strip width is dependent, inter alia, on the length of the time window within which the radar echoes are received which have been backscattered from the transmitted pulses. The received echoes are converted in frequency (mixed), demodulated, digitized and stored as so-called raw data in a two-dimensional echo signal memory.

Each SAR processing substantially comprises a range compression, a correction of the target range variation that is also known as range cell migration, and an azimuth compression. The geometric resolution in the range direction is a function of the bandwidth of the transmitted radar pulses. For improving this resolution, the transmitted pulses are modulated beforehand, in most cases by use of a linear frequency modulation which also hereunder will always be considered as a precondition. Range compression is to be understood as a filtration of the received signals in the range direction in accordance with the optimal filter (matched filter) theory, whereby the temporally expanded signals will be compressed into pulses.

The target range variation (range migration) is a result of the change of the range between the antenna and the point target during the formation of the synthetic aperture. The correction of the range migration will correct the range variation of the echoes belonging to a point target in the two-dimensional raw-data echo memory.

The pulse compression in the azimuth direction according to the optimal filter theory corresponds to the formation of the synthetic aperture. The azimuth modulation is also a result of the range variation between the antenna and the target during flyby of the carrier platform. The optimal filtration is defined as a coherent sum-up of all echoes which belong to an azimuth position. If the target range variation is corrected prior to azimuth compression, azimuth compression can be realized by a one-dimensional filtering function.

Spotlight SAR and sliding spotlight SAR are operational modes of SAR systems which allow for a significantly higher geometric resolution. In the spotlight mode, the antenna is during the complete flyby controlled in such a manner, i.e. is correspondingly rotated in the azimuth, that it will illuminate the same scene area (spot). Thereby, the azimuth resolution can be improved in comparison to the usual strip mapping mode. The observed scene dimensions, however, are drastically reduced. In the sliding spotlight mode, the rotation center is not located in the center of the antenna but farther away from the illuminated scene, thus making it possible to cover a larger azimuth region than in the spotlight case.

A further SAR capturing mode is the so-called ScanSAR mode. In the ScanSAR mode, the antenna beam is periodically changed so as to illuminate different subswaths in the range direction, i.e. strips arranged at different ranges from the flight path. This makes it possible to increase the strip width at the expense of the azimuth resolution. This mode has also become known under the term "wide swath mode".

Hereunder, a more detailed description of the ScanSAR mode will be rendered. Wide swath coverage is achieved by periodic switching of the antenna beam elevation so that the antenna beam—depending on the switched-on elevation angle—is directed onto a different range subswath. Switching the antenna beam has the consequence that the sensor will capture a finite sequence of echoes, i.e. a burst, for each of the imaged subswaths. In each subswath, the scan will perform a cyclical capturing of bursts for a holding time $T_D$ which will be repeated with a period $T_R$ ("cycle time").

The ratio $T_F/T_R$ rounded down to the lowest integer ($T_F$ being the antenna footprint time) indicates the number of mapped observations. The burst mode operation which is required for achieving a wide-swath coverage, will delimit the Doppler history for each target to a ratio $T_D/T_F$ in comparison to an equivalent strip mapping (stripmap) SAR capturing. As a result thereof, the captured azimuth bandwidth for each target will be reduced by the same amount, and the azimuth resolution will deteriorate correspondingly.

The ScanSAR mode has several disadvantages. There are caused a "scalloping", i.e. a periodic modulation of the amplitude in the focused image, as well as an amplitude-variable ambiguity ratio and a noise-equivalent sigma-zero ($\sigma_0$). These occurrences are a consequence of the fact that different targets are observed by use of different regions of the antenna azimuth diagram.

In an article by F. De Zan, A. Monti Guarnieri: "TOPSAR: Terrain observation by progressive scan", IEEE Trans. on Geosci. and Remote Sensing, Vol. 44, No. 9, pp. 2352-2360, September 2006, a novel wide-swath capturing mode was proposed which is called TOPS-SAR. This mode overcomes the major disadvantages of the above described ScanSAR mode by controlling the antenna in the flight direction.

The approach proposed in the above article for achieving the same swath coverage while avoiding the undesired effects, consists in counterrotating the antenna during the capturing, i.e. in the opposite rotational direction from rearward to forward, at a constant rotational speed $\omega_r$ (see FIG. 1), in contrast to the spotlight case which leads to an opposite effect, i.e. a deterioration of the azimuth resolution.

Figure 1:
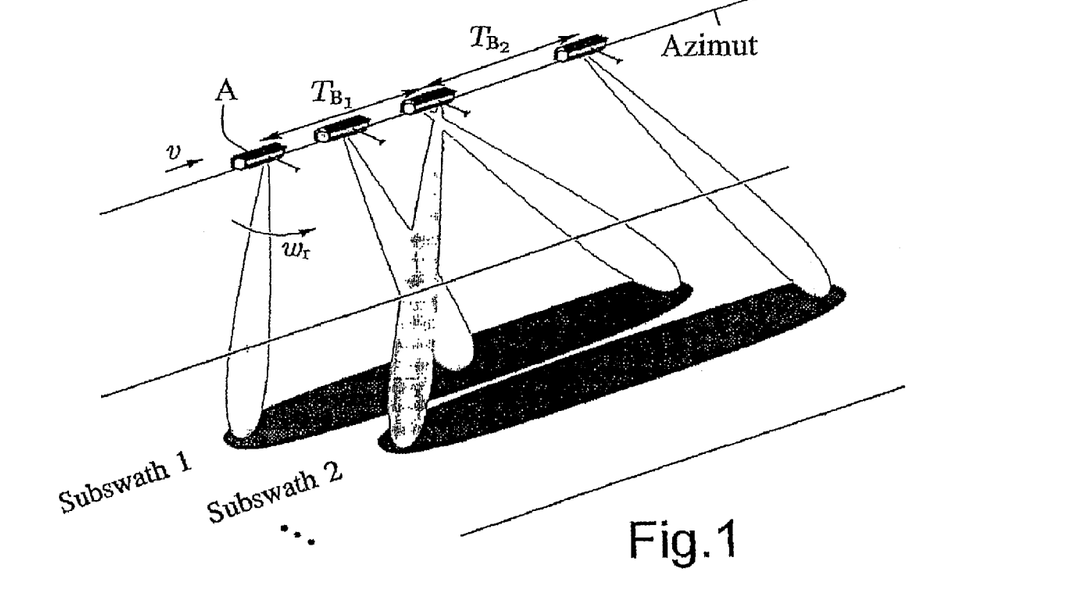
FIG. 1 illustrates an already described capturing geometry for the TOPS mapping mode.

However, all targets are observed by use of the same azimuth antenna diagram, and for this reason the scalloping effect will vanish, and the azimuth ambiguities and the noise-equivalent sigma-zero will become constant in the azimuth direction. At the end of a burst (burst duration $T_{B1}, T_{B2}, \ldots$), the angle of view of the antenna A moving at the velocity v in the azimuth direction will be adjusted for illumination of a subsequent subswath, that is, from the direction toward the first subswath (subswath 1), it will be changed backward again for illuminating the second subswath (subswath 2). When the last subswath has been mapped, the antenna will be directed again to the first subswath (subswath 1) so that no gaps will be left between bursts of the same subswath.

As to the TOPS raw data signal in a burst, this signal has similarities to that in ScanSAR as well as that in spotlight. The TOPS signal is similar to the spotlight signal in the sense that the scene bandwidth is larger than the pulse repetition frequency PRF. It has also similarities to the signal in the ScanSAR mode in the sense that the burst duration is shorter than the focused initial burst. The SAR signal characteristics can be clearly visualized by means of a time-frequency diagram.

Figure 2:
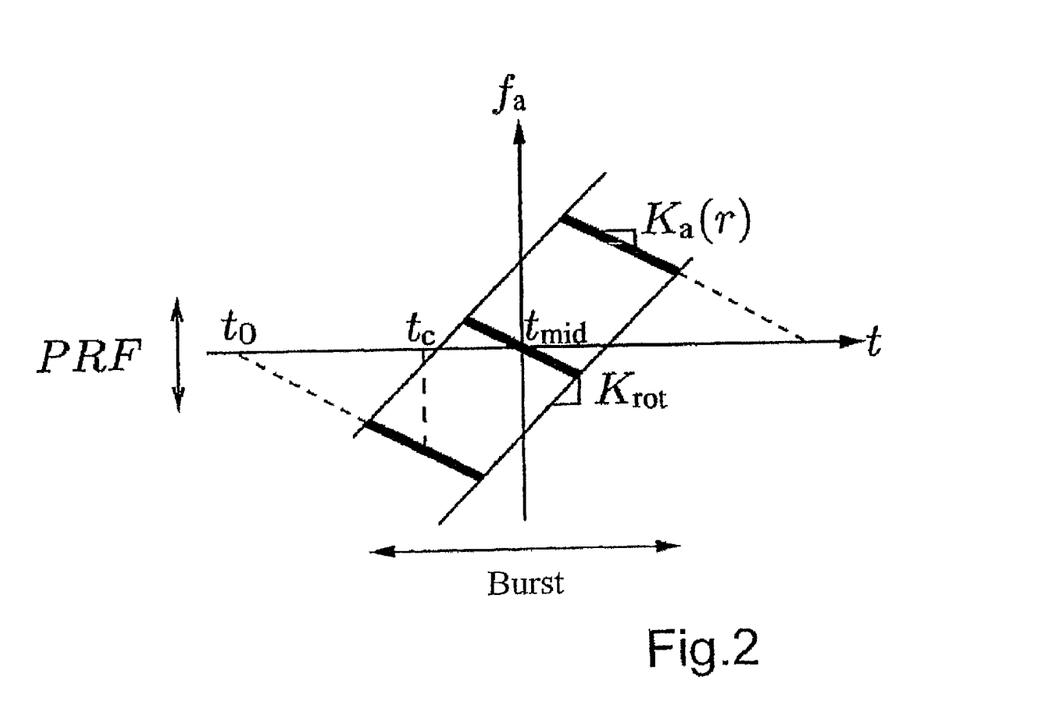
FIG. 2 illustrates a likewise already described time-frequency diagram which is characteristic of the TOPS mapping mode.

The Doppler history of three targets at the same position in the distance direction (range direction) but a different position in the azimuth direction, is represented by thick continuous lines (FIG. 2). The abscissa corresponds to the azimuth time t, and the ordinate corresponds to the current frequency $f_a$. The target at the start of the burst is observed under a negative squint angle, which will result in negative Doppler frequencies. On the other hand, the target at the end of the burst has positive Doppler frequencies.

Generally, the overall scene bandwidth spans a plurality of PRFs, in a manner similar to the one in the spotlight mode. Correspondingly, there is required a procedure to compensate for this insufficient scan of the azimuth signal.

As to the similarities with ScanSAR, the first mapped target (FIG. 2) has to be considered. It will be observed at the point of time $t_c$ which is called the beam-center time $t_{mid}$; however, after focusing, the target should appear at the Doppler zero position $t_0$. For this reason, the focused initial burst is larger than the real burst duration.

In the above mentioned article wherein the TOPS mode is presented, also a specially dedicated processor is proposed. For adaptation to an azimuth width which is larger than the pulse repetition frequency PRF, this processor uses a pre-processing step as described in the article by C. Prati, A. Monti Guarnieri, F. Rocca: "SPOT mode SAR focusing with the ω-k technique", Proc. IEEE Geoscience and Remote Sensing Symposium (IGARSS), Espoo, Finnland, Jun. 3-6, 1991, pp. 631-634.

In this step, the data in the spectral range are unfolded for accommodating a larger scene bandwidth. In this manner, a standard wave-number stripmap processor or any other desired SAR stripmap processor can be used for focusing the data.

In order to finally perform an adaptation to the largest focused initial burst, use is made of a post-processing solution as described in the article by A. Monti Guarnieri, C. Prati: "ScanSAR focusing and interferometry", IEEE Transactions on Geoscience and Remote Sensing, Vol. 34, No. 4, pp. 1029-1038, July 1996. In this step, the data will be unfolded in the time domain in a manner similar to that in the pre-processing step. A multi-rate filter bank allows for applying an azimuth-dependent filtration.

Aside from the processor commented above, no mention is made in literature of explicit processors for the processing of data which are captured in the TOPS mode. A possible solution could reside in the combination of the chirp scaling method with subapertures, and in the SPECAN method improved by azimuth scaling which is applied in the sliding spotlight mode as known from the article by J. Mittermayer, R. Lord, E. Börner: "Sliding spotlight SAR processing for TerraSAR-X using a new formulation of the extended chirp scaling algorithm", Proc. IEEE Geoscience and Remote Sensing Symposium (IGARSS), Toulouse, France, Jul. 21-25, 2003. In this case, a combination of the SPECAN method improved by azimuth scaling as proposed in EP 0 795 762 B1, is used together with a subaperture solution known from EP 0 924 534 B1 for correction of the target range variation.

Correction of the target range variation is performed by use of the chirp scaling algorithm which is described in the article by A. Moreira, J. Mittermayer and R. Scheiber: "Extended Chirp Scaling Algorithm for Air- and Spaceborne SAR Data Processing in Stripmap and ScanSAR Imaging Modes", IEEE Transactions on Geoscience and Remote Sensing, Vol. 34, No. 5, 1996, pp. 1123-1136.

The larger azimuth scene bandwidth can be taken into consideration by use of subapertures in the time domain so that the current bandwidth within a subaperture is smaller than the pulse repetition frequency PRF. The SPECAN method improved by azimuth scaling can then be applied to the azimuth signal so as to take into consideration the focused initial burst which is larger than the capture burst.

The above explained processor which is specially provided for the TOPS mode has the disadvantage of requiring pre- and post-processing steps so as to be able to handle the peculiarities of the TOPS signal, which will cause an increase of the computational expenditure. Beyond this, there is also necessitated a Stolt transformation which represents an interpolation, in order to complete the correction of the range migration. The multi-rate filter band requires that the data be processed in small blocks in the azimuth time with a certain overlap, thus causing inefficiency and imprecision when the azimuth processing is performed.

The use of subapertures for consideration of the larger scene bandwidth together with the SPECAN method improved by azimuth scaling has quite some disadvantages in the TOPS case. Particularly, the SPECAN method improved by azimuth scaling is not efficient, which is due to the fact that the focused image is obtained after a direct Fourier transformation (it is focused in the range Doppler region). Thus, each time when the sine signals have frequencies higher than the pulse repetition frequency PRF, aliasing (subscanning by backfolding) will occur. The frequency of these signals is dependent on the sensor velocity v, the wavelength λ, the selected scaling range and the azimuth position of the target.

The first two factors cannot be changed during processing, and the scaling range should normally be within the mapped strip to thus minimize the required extent of the subaperture for the range variation correction. Otherwise, the processing would become inefficient. The size of the scene imposes a restriction on an efficient use of the SPECAN method improved by azimuth scaling. For small scene sizes, which are existent in the spotlight or sliding spotlight mode, or for small burst lengths, as existent in the ScanSAR mode, this aliasing will not occur and the processing will become efficient.

In the TOPS case, however, the aliasing will occur with certainty because the scene size for a burst is normally rather large. Azimuth block processing could be an option in order to focus the images with the aid of the SPECAN method improved by azimuth scaling; however, this solution is inefficient. Another possibility could reside in increasing the PRF scan prior to the azimuth scaling operation by means of zero padding; however, also here, the computational expenditure would increase and the processing would be inefficient.

The original azimuth scaling approach does not constitute an efficient solution which would be applicable for the TOPS mode and the sliding spotlight mode for the purpose of azimuth sidelobe suppression. This is a consequence of the azimuth frequency variation and the azimuth time position variation of the required azimuth reference function. According to the article by A. Moreira, R. Scheiber, J. Mittermayer: "Azimuth and Range Scaling for SAR and ScanSAR Processing", Proc. IEEE Geoscience and Remote Sensing Symposium (IGARSS), Lincoln, Nebr., USA, 1996, the azimuth scan of the image can be changed. This, however, will require that all targets are situated in the base band so that, consequently, this approach is not an option for the TOPS mode and the sliding spotlight mode.

SUMMARY OF THE INVENTION

It is an object of the present invention, in a method for processing of TOPS-SAR-raw data into image data, to perform this processing in an interpolation-free, highly precise and very efficient manner while avoiding azimuth aliasing (backfolding) and further disadvantages which would otherwise occur in the processing of TOPS raw signals.

According to the present invention, this is achieved, in a method for processing TOPS (Terrain Observation by Progressive Scan)-SAR(Synthetic Aperture Radar) raw data into exact image data, by the features indicated in the characterizing part of claim 1 attached hereto.

In the method according to the invention, a subaperture processing is performed in order to avoid azimuth aliasing. Within each subaperture, there are performed a range compression and a correction of the target range variation whereas, for processing of the azimuth signal, use is made of a novel azimuth scaling solution which is called baseband azimuth scaling.

During the processing in the range, a subdivision into azimuth subapertures is performed. As a result, a lower pulse repetition frequency PRF can be used because the scanning theorem needs to be fulfilled only within the subapertures in the azimuth direction. In this step, each desired stripmap processor will be suited for performing the steps of range compression, correction of the range variation, and secondary range compression.

According to a preferred example, use is made of the extended chirp scaling algorithm described in the article by A. Moreira, J. Mittermayer and R. Scheiber: "Extended Chirp Scaling Algorithm for Air- and Spaceborne SAR Data Processing in Stripmap and ScanSAR Imaging Modes", IEEE Transactions on Geoscience and Remote Sensing, Vol. 34, No. 5, pp. 1123-1136, 1996. This algorithm makes it possible to carry out the indicated steps without using any interpolation, whereby this solution is rendered efficient and more precise.

According to the present invention, azimuth processing is performed by an improved method of azimuth scaling which is effective to prevent a long azimuth reference function and thus a large azimuth size during the processing. The scaling range is not constant but will depend on the range. It is not equal to the original range vector. It will be calculated in such a manner that, in combination with the later derotation step, a constant azimuth scan will be achieved for all ranges.

With the baseband azimuth scaling according to the present invention, the advantages of the original azimuth scaling for the ScanSAR mode and the spotlight mode are maintained. The azimuth scaling will thus take into consideration the hyperbolic azimuth modulation so that the azimuth processing for all ranges is highly precise and there is no necessity for a new scan with interpolation for geometric correction in the azimuth direction. The desired scanning interval in the processed image can be adjusted by selection of a reference scaling range wherein, in this manner, the recombination of different subswaths is facilitated.

The selected derotation function which is applied in the azimuth time domain makes it possible that all targets lie in the baseband while, in this manner, the effective chirp rate will be changed. Since, due to the azimuth scaling step, the phase is purely quadratic, use can thus be made of an optimal filter (matched filter) which will take into account the effective chirp rate. In this step, a weighting function can be included during the optimal filtration for efficient reduction of azimuth sidelobes. A subsequent inverse Fast Fourier Transformation will result in a focused image, and a final phase function in the time domain will allow for accurate phase maintenance. Thus, the method according to the present invention has a very high phase accuracy.

On the whole, the following advantages are accomplished by the method of the invention:

By way of the subaperture processing, a lower pulse repetition frequency PRF can be used during processing, and also the use of the short Fast Fourier Transformation (FFT) is made possible, which leads to a reduction of the computational expenditure.

The baseband azimuth scaling solution according to the invention allows for realization of the desired scanning interval as well as for a baseband treatment of all targets without the need for further steps. During optimal filtration, also sidelobe reduction along the azimuth dimension can be efficiently performed through weighting. The novel azimuth processing will then be performed only by use of multipliers and Fourier transformations while avoiding interpolations. As a result, there is achieved a highly precise, phase-maintaining processing.

Claim 2 relates to an advantageous application of said method of claim 1 for processing TOPS (Terrain Observation by Progressive Scan)-SAR (Synthetic Aperture Radar) raw data.

DESCRIPTION OF THE DRAWINGS

The invention will be explained in greater detail hereunder by way of preferred embodiments with reference to the accompanying drawings. In the drawings—

DESCRIPTION OF THE INVENTION

Figure 3:
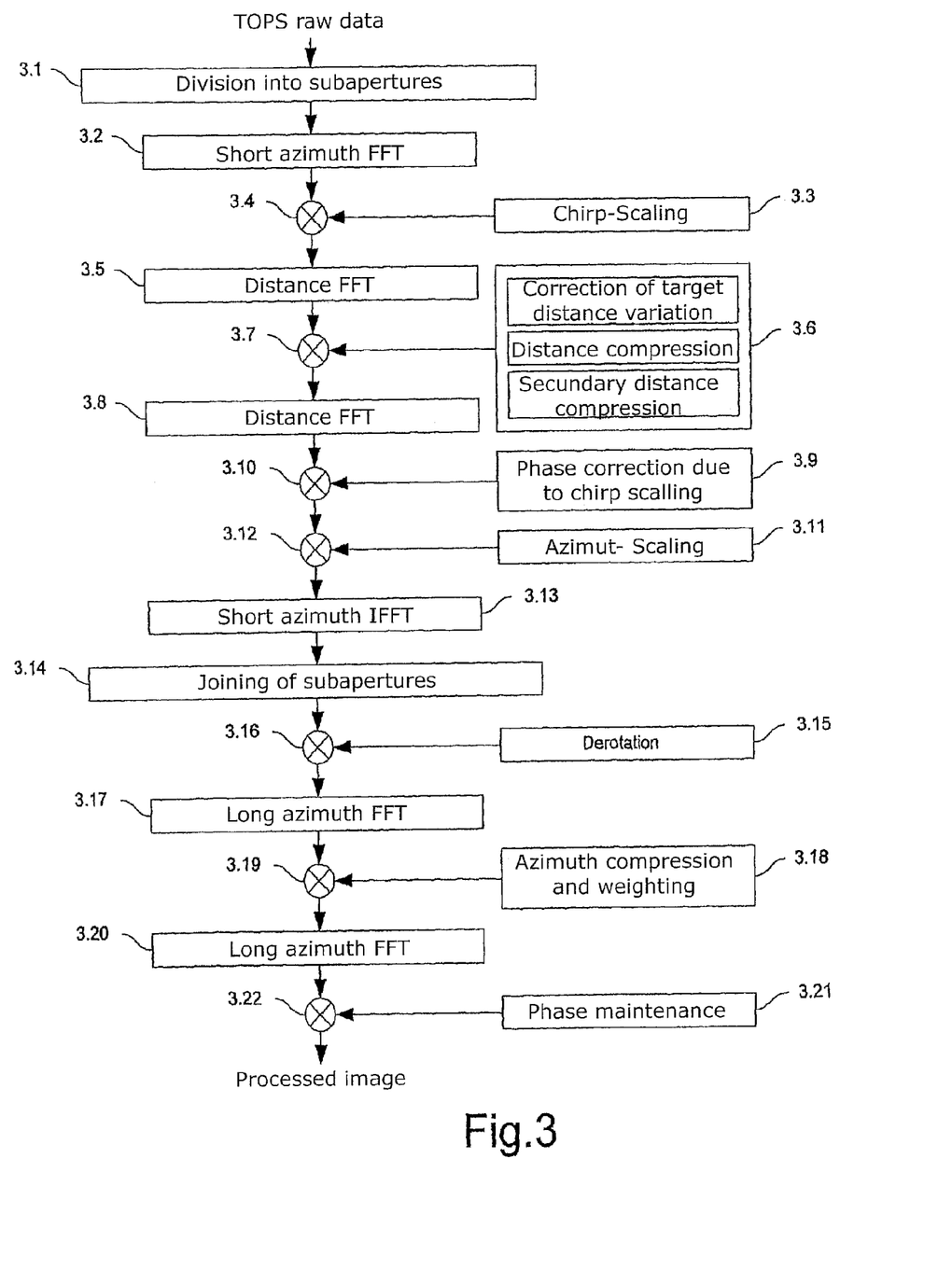
FIG. 3 is a schematic flow chart of a preferred procedure according to the method of the present invention.

FIG. 3 is a schematic flowchart showing the individual procedural steps according to a preferred embodiment of the present invention. In the equations related to FIG. 3, t denotes the time vector in the azimuth direction (i.e. the "slow" time), τ denotes the time in the distance direction also referred to as the range direction (i.e. the echo propagation time), $f_a$ denotes the azimuth frequency vector (i.e. the Doppler frequency), $f_r$ denotes the range frequency, $r_0$ denotes the distance to a point target, r denotes the range vector, $\lambda$ denotes the wavelength, c denotes the light velocity and v denotes the speed on the ground.

Figure 4:
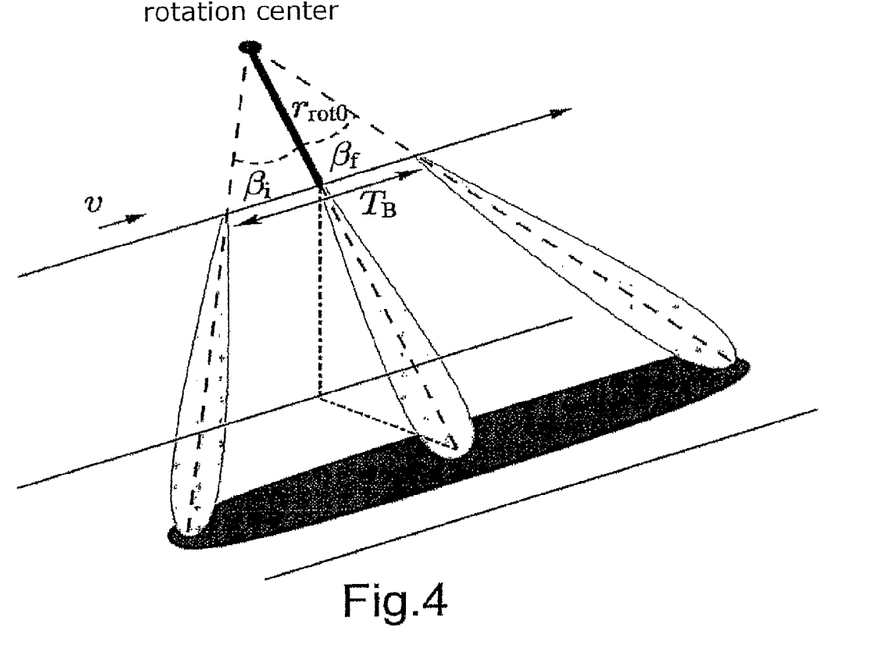
FIG. 4 is a schematic view showing the site of the rotational center, and the rotation range in the TOPS mapping mode.

In step 3.1, the TOPS raw data are first subdivided into subapertures. This subdivision is similar to the one performed in the spotlight processing according to the already mentioned patent specification EP 0 924 534 B1. During the processing, the azimuth bandwidth $B_a$ of a point target, which depends on the antenna beam width, has to be sufficiently scanned. The total azimuth bandwidth of the scene, however, is larger than the maximum average bandwidth $B_a$ because the azimuth positioning of a target will cause a frequency offset. The current frequency is given by the equation $$f_i = K_{rot} \cdot t = -\frac{2 \cdot v^2}{\lambda \cdot r_{rot0}} \cdot t, \tag{1}$$

wherein $r_{rot0}$ is the vector range to the rotation center given by the geometry, as illustrated in FIG. 4.

When the data are processed, the pulse repetition frequency PRF should be at least as large as the total azimuth bandwidth $B_{a,tota}$ in order to prevent ambiguous azimuth frequencies during the correction of the range variation. Ambiguous azimuth frequencies would cause a loss of resolution and a deterioration of the final, focused image due to the occurrence of "ghosting".

By the use of subaperture processing, a lower pulse repetition frequency PRF will thus be sufficient. Computation of a subaperture time is indicated by equation (2):

$$T_{sub} \le \frac{PRF - B_a}{|K_{rot}|}. \tag{2}$$

After the subdividing into subapertures in step 3.1, the processing for each subaperture i will be continued with the associated Doppler centroid $f_{DC,i}$. To avoid a poor processing result caused by the subaperture processing, the subapertures will be formed with a slight overlap.

As used hereunder, a "short azimuth FFT (Fast Fourier Transformation)" and respectively a "short azimuth IFFT (Inverse Fast Fourier Transformation)" are to be understood as the short length or small point number, as obtained due to the application of a subaperture processing, of FFT and respectively IFFT operations in the azimuth direction. After the joining of the subapertures (as explained hereunder in the context of step 3.14), the full length of the time signal has been established again, and the final FFT operations thus must be a "long azimuth FFT" and respectively a "long azimuth IFFT".

In the processing step 3.2, the data in the range Doppler region will be transformed via a short azimuth FFT. Thereafter, chirp scaling is performed, for which the chirp scaling function $H_{cs}(f_a, \tau; r_0)$ (block 3.3) indicated in equation (5) is multiplied by the signal in a first multiplication unit 3.4.

Chirp scaling will result in an adaptation of the range-dependent curvature of the path to the curvature of the reference path for a reference range $r_{ref}$ wherein a path represents the geometric location of the phase centers of all range signals belonging to a point target. The shape of the reference path can be described with $t_{a,ref}(f_a)$ in the following manner:

$$t_{a,ref} = \frac{2 \cdot r_{ref}}{c} \cdot (a(f_a) + 1), \tag{3}$$

wherein the linear scaling factor $a(f_a)$ describes the frequency dependency of the range variation:

$$a(f_a) = \frac{1}{\sqrt{1 - \left(\frac{\lambda \cdot f_a}{2 \cdot v}\right)^2}} - 1. \tag{4}$$

In the chirp scaling function $H_{cs}$, $K_{eff}$ is the modulation rate in the range direction which is dependent on the azimuth frequency and the reference range because it includes the secondary range compression:

$$H_{cs}(f_a, \tau; r_0) = \exp[-j \cdot \pi \cdot K_{eff}(f_a; r_{ref}) \cdot a(f_a) \cdot (\tau - \tau_{ref}(f_a))]. \tag{5}$$

After chirp scaling, a range FFT (block 3.5) is used for transforming the data into the two-dimensional frequency range, wherein the range compression, the correction of the target range variation, and the secondary range compression are performed through multiplication by the phase function $H_{rcmc}(f_a, f_r; r_{ref})$ (block 3.6) in a second multiplication unit 3.7:

$$H_{rcmc}(f_a, f_r; r_{ref}) = \tag{6}$$
$$\exp\left[-j\frac{\pi}{K_{eff}(f_a; r_{ref}) \cdot (1 + a(f_a))} f_r^2\right] \cdot \exp\left[j\frac{4 \cdot \pi}{c} \cdot r_{ref} \cdot a(f_a) \cdot f_r\right].$$

In equation (6), the first phase function denotes the filtering function for range compression. The second phase function performs the correction of the target range variation. As a result of the chirp scaling performed by equation (5), this correction can be accomplished simultaneously for all ranges through linear displacement in the range direction which is dependent only on the azimuth frequency.

In the next step of the process, an IFFT in the range (block 3.8) is used for reverse transformation into the range Doppler region. During chirp scaling, there is introduced into the signal an additional, range-dependent azimuth phase offset which will be removed through multiplication by a correction function $H_{corr}(f_a; r_0)$ (block 3.9) as indicated in equation (7), in a third multiplication unit 3.10:

$$H_{corr}(f_a; r_0) = \exp\left[\begin{array}{c} j \cdot \pi \cdot K_{eff}(f_a; r_{ref}) \cdot \\ (1 + a(f_a)) \cdot \\ a(f_a) \cdot \\ \left(\frac{2}{c} \cdot (r_0 - r_{ref})\right)^2 \end{array}\right]. \tag{7}$$

In the next step of the process, a new azimuth scaling is carried out. This will result in the removal of the hyperbolic azimuth phase and by the replacement of the same by a quadratic phase form through multiplication of the signals by a phase function $H_a(f_a; r_0)$ (block 3.11) in a fourth multiplication unit 3.12:

$$H_a(f_a; r_0) = \exp\left[j \cdot \frac{4 \cdot \pi}{\lambda} \cdot r_0 \cdot (\beta(f_a) - 1)\right] \cdot \exp\left[-j \cdot \frac{\pi}{K_{scl}(r)} \cdot f_a^2\right] \quad (8)$$

with $$\beta(f_a) = \sqrt{1 - \left(\frac{\lambda \cdot f_a}{2 \cdot v}\right)^2}. \quad (9)$$

The purely quadratic phase history is described by the scaling Doppler rate $K_{scl}(r)$. The scaling range is not constant and is not equal to the original range vector r; it depends on the range, as described in equations (10) to (12). The reason for the use of this range-depending scaling range will be explained later.

$$K_{scl}(r) = -\frac{2 \cdot v^2}{\lambda \cdot r_{scl}(r)} \quad (10)$$

$$r_{scl}(r) = \frac{r_{scl0}}{r_{rot0}} r_{rot}(r) \quad (11)$$

$$r_{rot}(r) = \frac{r_{rot0} - r}{1 - r_{scl0}/r_{rot0}}. \quad (12)$$

Since the azimuth scaling in the time domain will result in a shift of the azimuth signals which are not located in the illumination center, a slight extension of the azimuth dimension is required. Usually, however, this extension falls into the range which is reached by the extension of the subaperture size to the next power of two. The number of azimuth points should be a power of two so as to minimize the computational effort of the FFT/IFFT steps.

In the next step of the process, an azimuth IFFT (block 3.13) is used for a reverse transformation into the azimuth/range time. Then, the individual subapertures will be joined in step 3.14. Thereafter, the bandwidth of the signal will still span the pulse repetition frequency PRF. For this reason, a demodulation can be performed in a fifth demodulation unit 3.16 by use of the derotation function $H_{derot}(t,r)$ (block 3.15) indicated in equation (13).

Figure 5:
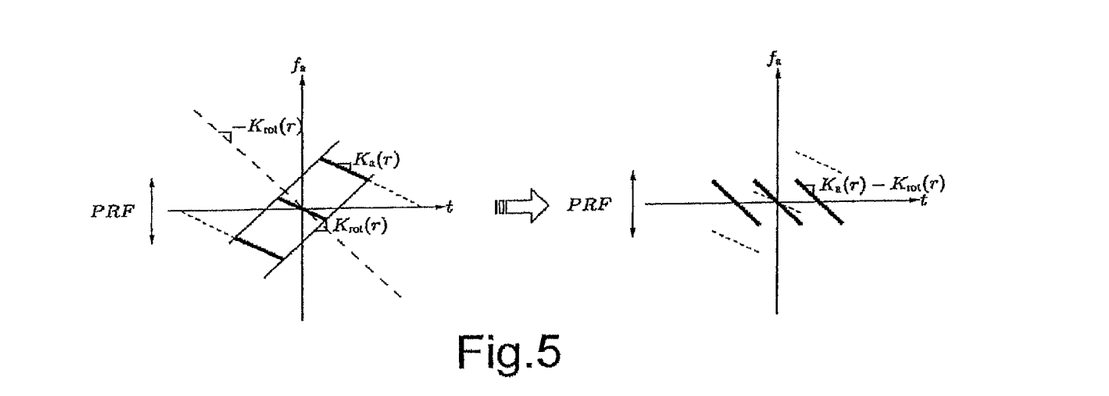
FIG. 5 is a diagram illustrating how the conversion into baseband can be performed by multiplication with a chirp function (long interrupted line) in the time domain so that an azimuth sidelobe suppression can be efficiently performed.

The effect of this derotation function on the signal is illustrated in FIG. 5. The chirp rate used in the derotation function depends on the range and is indicated in equation (14). At this point, the effective chirp rate of the signal is changed corresponding to equation (15).

$$H_{derot}(t, r) = \exp[-j \cdot \pi \cdot K_{rot}(r) \cdot (t - t_{mid})^2] \quad (13)$$

$$K_{rot}(r) = -\frac{2 \cdot v^2}{\lambda \cdot r_{rot}(r)} \quad (14)$$

$$K_{eff}(r) = K_{scl}(r) - K_{rot}(r). \quad (15)$$

Due to the fact that the data spectrum for all targets is now situated in the base band, use can be made of an optimal filter. After a long azimuth FFT (block 3.17), an optimal filtration is carried out by use of equation (16) (block 3.18) in a sixth multiplication unit 3.19. At this point, it is also easily possible to perform a sidelobe suppression by means of a weighting function $W(f_a)$. In fact, this is the only optimal point where the application of the weighting function leads to correct results in the TOPS case.

$$H_{comp}(f_a, r) = W(f_a) \cdot \exp\left[j \cdot \frac{\pi}{K_{eff}(r)} \cdot f_a^2\right], \quad (16)$$

$$-\frac{PRF}{2} + f_{DC} < f_a < \frac{PRF}{2} + f_{DC}$$

Here, $f_{DC}$ is the average Doppler centroid of the data capture. A long IFFT (block 3.20) will lead to a focused signal. However, for phase-maintaining processing, the data have to be multiplied by the phase function $H_{phase}(t,r)$ with a seventh multiplication unit 3.22 being used for this purpose.

$$H_{phase}(t, r) = \exp\left[j \cdot \pi \cdot K_t(r) \cdot \left(1 - \frac{r_{scl0}}{r_{rot0}}\right)^2 \cdot (t - t_{mid})^2\right], \quad (17)$$

wherein $$K_t(r) = -\frac{2 \cdot v^2}{\lambda \cdot (r_{rot}(r) - r_{scl}(r))}. \quad (18)$$

Figure 6:
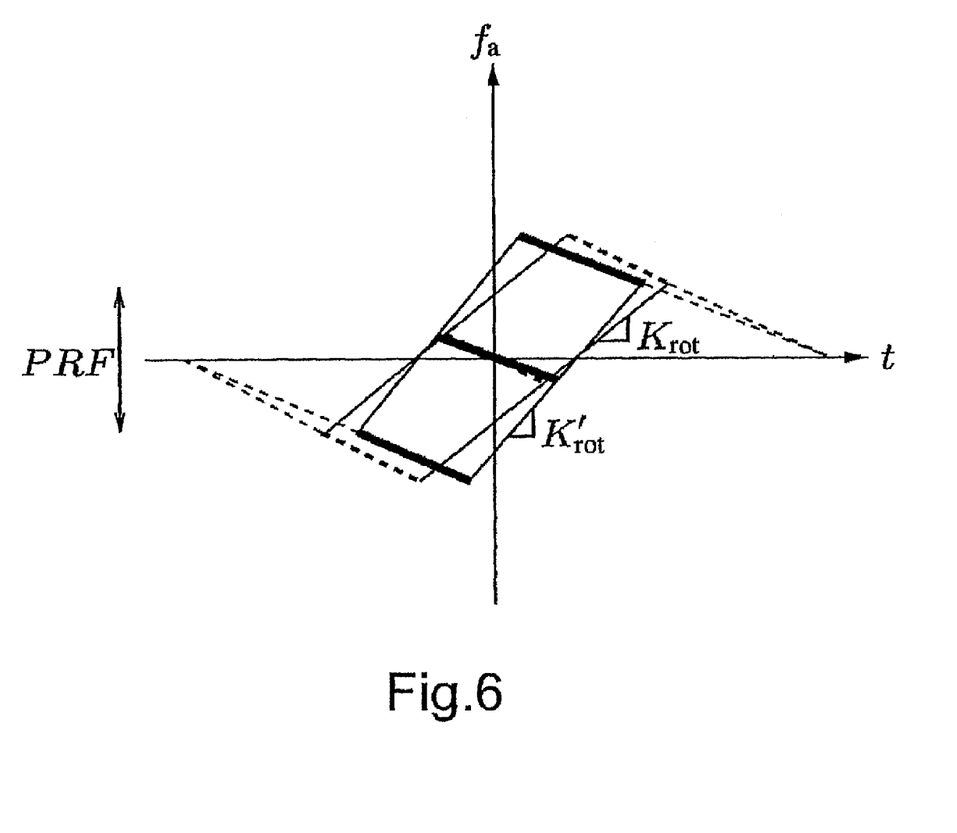
FIG. 6 is a time-frequency diagram illustrating the manner in which the scaling operation will change the required rotation range for thus placing into the baseband the signal for targets in a range different from a scaling range, wherein the interrupted lines represent the diagram state prior to the scaling operation and the continuous lines represent the state after the scaling operation, and FIG. 7 are contoured representations illustrating the processing result, as obtained by the method of the present invention, of nine point targets in a short range (top), a medium range (center) and a far range (bottom).

The necessity of a range-dependent scaling rate will be explained hereunder. Image scanning by use of the azimuth scaling solution is indicated in equation (19).

$$\Delta x_{new} = \Delta x_{orig} \cdot \left(1 - \frac{r_{scl}}{r_{rot}}\right) = \frac{v}{PRF} \cdot \left(1 - \frac{r_{scl}}{r_{rot}}\right), \quad (19)$$

wherein $\Delta x_{orig}$ is the original scan equal to v/PRF. One could also consider the use of a constant scaling range $r'_{scl}$; then, however, the rotation rate will change, as illustrated in FIG. 6 and expressed by equation (20):

$$r'_{rot} = r_{rot0} - (r - r'_{scl}) \quad (20)$$

If equation (20) is employed so that the signal will be situated correctly in baseband when using a constant scaling range, the final azimuth scan is dependent on the range as stated in equation (19). Since it is desired to have the same azimuth scan for all ranges and simultaneously to have all targets correctly in baseband, the solution resides in using a scaling vector and a derotation vector which are indicated in equation (11) and respectively equation (12). If this is carried out this way, the azimuth scan is given by equation (21):

$$\Delta x_{new} = \Delta x_{orig} \cdot \left(1 - \frac{r_{scl0}}{r_{rot0}}\right), \quad (21)$$

wherein $r_{scl0}$ is selected corresponding to the final azimuth scan and should be within the swath for minimizing the required extension of the subapertures. It is to be noted that, in the TOPS capturing mode, $r_{rot0}$ is negative so that the new image scan is larger than the original raw data scan. This is desirable because the resolution is worse than in case of the strip mapping (stripmap) mode.

The solution proposed by the present invention allows for an efficient processing of TOPS data because no block processing is required for azimuth focusing. The proposed solution also allows for selecting the final azimuth ranges. The latter aspect is highly useful since the necessity of interpolation for recombining different subswaths is avoided (Different subswaths have different pulse repetition frequencies PRF and thus different azimuth scans). The baseband azimuth scaling thus guarantees that all targets are in baseband and that the desired azimuth scanning can be selected.

Figure 7:
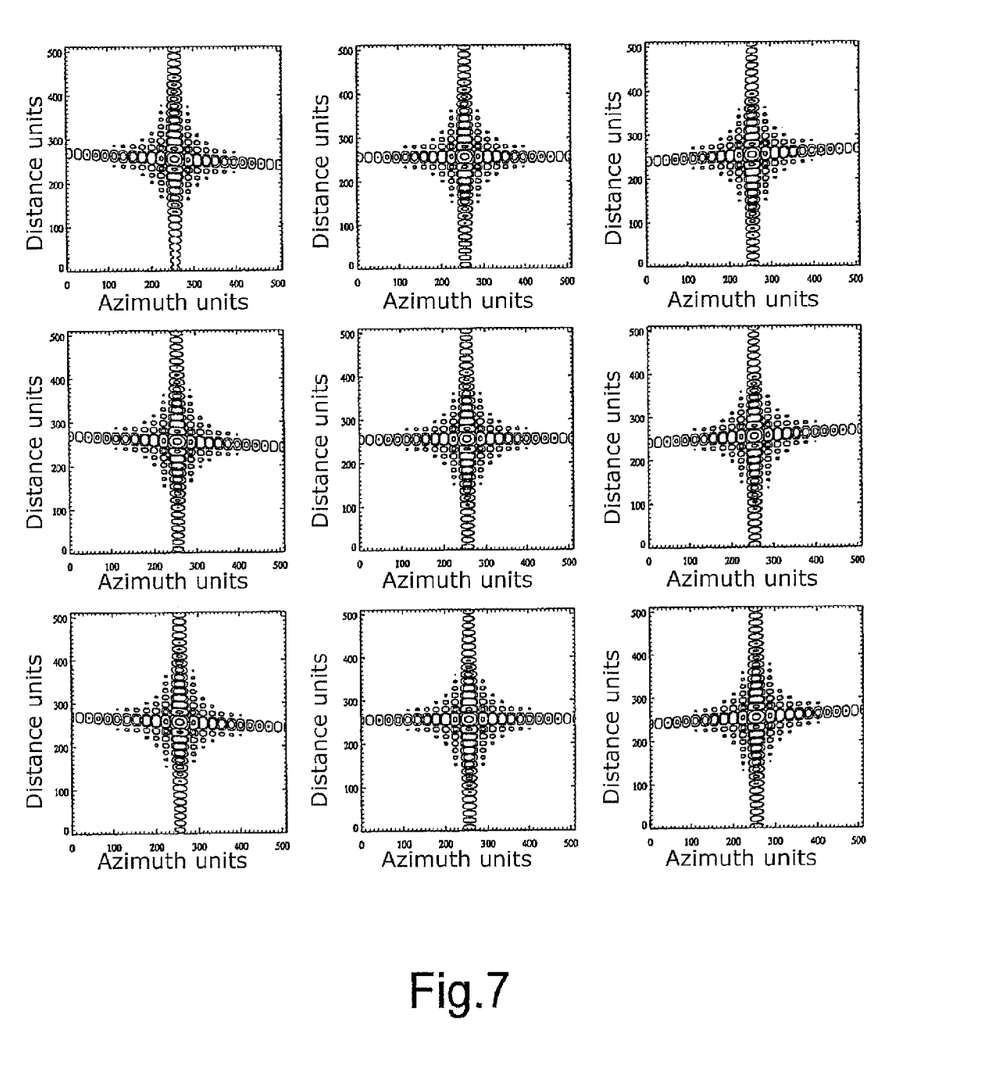

FIG. 1 shows the result of the processing of nine simulated targets in the X-band by use of the method according to the invention. Since no weighting functions have been used during processing, the contour-line representation in FIG. 7 shows two-dimensional sinc functions (sinc x=sin x/x). The nine point targets have different range and azimuth positions corresponding to the same TOPS burst.

The targets are arranged in such a manner that the targets in the corner position delimit a scene of the dimensions 7200 m×24655 m in the azimuth direction. The simulated geometry corresponds to the situation on board of spacecraft and the selected reference scaling range was 596091.37 m. The theoretic geometric resolutions being possible are about 14.16 m×0.89 m in the azimuth and respectively range dimension. The maximum deviations of the measured resolutions from the theoretical values are 2% in the azimuth and 1% in the range.

The invention claimed is:

1. A method for processing TOPS (Terrain Observation by Progressive Scan)-SAR(Synthetic Aperture Radar)—raw data into highly accurate image data, characterized by two-dimensional processing of the TOPS-SAR raw data through a chirp scaling method and a baseband azimuth scaling method using a processor to carry out the following successive steps:

a) subdividing the TOPS-SAR raw data into azimuth subaperture data (3.1);

b) performing a short-term azimuth FFT (3.2);

c) multiplying the signal by a chirp scaling function $H_{cs}$ which is given by $$H_{cs}(f_a, \tau; r_0) = \exp[-j \cdot \pi \cdot K_{eff}(f_a; r_{ref}) \cdot a(f_a) \cdot (\tau - \tau_{ref}(f_a))]$$

wherein $f_a$ is the azimuth frequency, $r_o$ is the shortest range from a target, $r_{ref}$ is a reference range, is the time in the distance direction which is also referred to as the range direction, i.e. the echo propagation time, the factor $a(f_a)$ is the frequency dependency of the range variation according to $$a(f_a) = \frac{1}{\sqrt{1-\left(\frac{\lambda \cdot f_a}{2 \cdot v}\right)^2}} - 1,$$

$\lambda$ is a wavelength, $v$ is the speed on the ground, $K_{eff}(f_a; r_{ref})$ is the modulation rate in the range direction depending on the azimuth frequency $f_a$ and the reference range $r_{ref}$, and $\tau_{ref}(f_a)$ is a reference echo propagation time (3.3, 3.4) depending the azimuth frequency $f_a$;

d) performing a range FFT for obtaining the signal in the two-dimensional frequency range (3.5);

e) multiplying the signal by the phase function $H_{rcmc}$ which is given by $$H_{rcmc}(f_a, f_r; r_{ref}) = \exp\left[-j\frac{\pi}{K_{eff}(f_a; r_{ref})} \cdot f_r^2\right] \cdot \exp\left[\frac{j\frac{4 \cdot \pi}{c} \cdot r_{ref} \cdot f}{a(f_a) \cdot f}\right]$$

(1 + a(f_a))

for performing the correction of the range variation, of the range compression and of the secondary range compression, $f_r$ being the range frequency and c being the light velocity (3.6, 3.7);

f) performing a range IFFT so as to include the signal into the range Doppler region (3.8);

g) multiplying the signal by a phase correction function $H_{corr}$ which is given by $$H_{corr}(f_a; r_0) = \exp\left[j \cdot \pi \cdot K_{eff}(f_a; r_{ref}) \cdot (1 + a(f_a)) \cdot a(f_a) \cdot \left(\frac{2}{c} \cdot (r_0 - r_{ref})\right)^2\right]$$

wherein $r_0$ is the shortest range to a point target (3.9, 3.10);

h) multiplying the two-dimensional data which are taken over in the range Doppler region and after performing the main steps of range compression and range variation correction of a target, by a phase function $H_a(f_a; r_0)$ defined by $$H_a(f_a; r_0) = \exp\left[j \cdot \frac{4 \cdot \pi}{\lambda} \cdot r_0 \cdot (\beta(f_a) - 1)\right] \cdot \exp\left[-j \cdot \frac{\pi}{K_{scl}(r)} \cdot f_a^2\right]$$

wherein $$\beta(f_a) = \sqrt{1-\left(\frac{\lambda \cdot f_a}{2 \cdot v}\right)^2}$$

$$K_{scl}(r) = -\frac{2 \cdot v^2}{\lambda \cdot r_{scl}(r)}$$

$$r_{scl}(r) = \frac{r_{scl0}}{r_{rot0}} r_{rot}(r)$$

$$r_{rot}(r) = \frac{r_{rot0} - r}{1 - r_{scl0}/r_{rot0}}$$

and r is the range vector, $K_{scl}(r)$ is a range-dependent Doppler rate, $r_{rot0}$ is a rotation range due to the TOPS geometry, $r_{scl0}$ is a scaling range selected according to the final desired image range, $r_{scl}(r)$ a scaling range vector, whereby the scaling range values are within a range dimension of an image and whereby $r_{rot}(r)$ is a range-dependent rotation range vector (3.11, 3.12);

i) transforming the subaperture data through short azimuth IFFTs back into the azimuth and range time domain (3.13);

j) joining the azimuth subapertures (3.14);

k) multiplying the two-dimensional data by a derotation function $H_{derot}(t,r)$ given by $$H_{derot}(t, r) = \exp[-j \cdot \pi \cdot K_{rot}(r) \cdot (t - t_{mid})^2]$$

$$K_{rot}(r) = -\frac{2 \cdot v^2}{\lambda \cdot r_{rot}(r)}$$

wherein t is the time vector in the azimuth direction and $t_{mid}$ is the middle time of the burst (3.15, 3.16);

l) transforming the derotated data through long azimuth FFTs into the range Doppler region (3.17);

m) subsequently, multiplying the two-dimensional data through an azimuth compression function $H_{comp}(f_a, r)$ which is given by $$H_{comp}(f_a, r) = W(f_a) \cdot \exp\left[j \cdot \frac{\pi}{K_{eff}(r)} \cdot f_a^2\right],$$

$$-\frac{PRF}{2} + f_{DC} < f_a < \frac{PRF}{2} + f_{DC}$$

wherein $$K_{eff}(r) = K_{scl}(r) - K_{rot}(r)$$

is the effective chirp rate after the scaling and derotation operations, $W(f_a)$ is the weighting function for sidelobe suppression and $f_{DC}$ is the average Doppler centroid of the data capturing, wherein, in the TOPS mode, this is the only optimal point at which the application of the weighting function for sidelobe suppression leads to correct results because all targets are in baseband (3.18, 3.19);

n) transforming the data through a long azimuth IFFT into the image data (3.20); and o) multiplying the two-dimensional image data through a phase function $H_{phase}(t,r)$ which is given by $$H_{phase}(t, r) = \exp\left[j \cdot \pi \cdot K_t(r) \cdot \left(1 - \frac{r_{scl0}}{r_{rot0}}\right)^2 \cdot (t - t_{mid})^2\right]$$

wherein $$K_t(r) = -\frac{2 \cdot v^2}{\lambda \cdot (r_{rot}(r) - r_{scl}(r))},$$

to achieve a phase maintenance (3.21, 3.22).

2. Use of the method according to according to claim 1 for two-dimensional processing of SAR, SONAR and seismic raw data in mapping modi involving the use of mechanical and/or electronic pivoting of the antenna diagram in the azimuth and/or elevation direction.

* * * * *